United States Patent Office 3,407,156
Patented Oct. 22, 1968

3,407,156
WEATHERABLE TRANSPARENT COATING COMPOSITION FOR WOOD SUBSTRATES
Robert W. La Berge, Magnolia, N.J., assignor to E. I. du Pont de Nemours and Company, Wilmington, Del., a corporation of Delaware
No Drawing. Filed June 3, 1964, Ser. No. 372,405
3 Claims. (Cl. 260—22)

This invention relates to a coating composition for protecting wood substrates from deterioration of weather, i.e., the combined effects of rain, sunlight and temperature changes. Particularly, this invention relates to a clear coating composition which following application to wood does not become hazy, crack, flake or peel when exposed to weathering, and still more particularly, this invention relates to a coating composition which following application to wood substrates remains clear when chalked by weathering and erodes at a uniform rate instead of cracking, flaking or peeling, thereby providing a long lasting and attractive clear coating for wood substrates.

Currently available exterior clear coating compositions for wood are not satisfactory because failure usually occurs in a relatively short time, sometimes within months upon exposure to weathering. Moreover, the failure generally occurs through microcracking that develops into severe interlaced cracking or checking, which, in turn, results in flaking or peeling of the coating from the substrate. This type of failure requires extensive and costly surface preparations, such as scraping, brushing and sanding prior to refinishing. The coating composition of this invention possesses superior durability to weathering in that it shows little change in appearance after long periods of weathering and does not fail by microchecking, cracking or peeling. Moreover, the instant coating composition chalks and erodes at a uniform rate on weathering and therefore, can be recoated with minimal surface preparation; in fact, the uniform erosion of the coating provides a preroughened surface to which another coat can readily be applied.

The coating composition of this invention for protecting a wood substrate from the deterioration of weather comprises a clear coating vehicle containing about 1–15% by weight of an ultraviolet light absorbing agent in addition to an extender pigment which has a refractive index of about 1.4–1.6, a particle size of less than 50 microns and is present in a pigment volume concentration of about 2–25%. This coating composition, when applied to a wood substrate, forms a flexible resinous layer which is non-cracking, remains clear when chalked by weathering and erodes at a uniform rate.

To provide the desirable weathering characteristics of the clear coating compositions of this invention, the extender pigment must be of a certain particle size and refractive index, and be present in a certain pigment volume concentration. The extender pigment should have approximately the same refractive index as the dried coating composition, that is, have a refractive index of about 1.4–1.6 and preferably about 1.4–1.56. The particle size of the extender pigment should be less than 50 microns (average diameter of particle) to form a clear dried coating, preferably about 0.015–50 microns, and more preferably about 0.015–6 microns. Pigment volume concentration of the extender pigment should be about 2–25%, and preferably, about 5–15%. Higher pigment volume concentrations tend to form an opaque coating.

Any extender pigments having the above characteristics can be used in this invention. Inorganic siliceous extender pigments, such as silica pigments, are useful in this invention. Finely divided amorphous or crystalline silica pigments with a particle size of 0.015–50 microns are particularly useful. But collodial silica with a particle size from 0.015–0.02 microns is preferred, since it provides the coating composition with the most desirable over-all properties.

Also, organic light dispersants with the above properties of particle size and refractive index can be used, such as high molecular weight polyacrylonitrile, polymethyl methacrylate and polystyrene. These light dispersants are preferably in the form of finely divided particles or may even be in the form of fiber segments which are within the above particle size range.

Small amounts of coloring agents can be added to a pigmented clear coating composition to give a desired hue or shade but still allow the coating to remain practically clear. For this purpose, agents, such as hydrous iron oxide, hydrous chromium oxide, and dyes, such as Monastral Blue, Green, Red or Violet, can be used.

The ultraviolet light absorbing agents useful in the compositions of this invention desirably should have the following characteristics:
 (1) A high absorptive capacity for light in the ultraviolet range (wave length of 300–400 millimicrons);
 (2) Remain stable after long periods of exposure to ultraviolet light;
 (3) Resist the action of water; and
 (4) Be substantially transparent.

The amount of ultraviolet light absorbing agent should be about 1–15% by weight of the vehicle and preferably about 5–10% by weight. Concentrations of agent over 15% by weight usually adversely affect the durability and clarity of the applied coating and concentrations under 1% generally do not provide the advantages of this invention.

A variety of ultraviolet absorbing agents well known in the art can be used in this invention. Ultraviolet absorbers disclosed in U.S. Patents 2,568,894 and 3,043,709, and having the above characteristics, are useful in this invention.

Substituted benzophenone derivatives having the structural formula

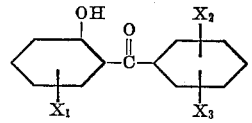

wherein $X_1$, $X_2$ and $X_3$ are individually selected from the following group: hydrogen, hydroxyl, alkyl, alkoxy and halogen are especially useful ultraviolet absorbing agents. One particularly preferred agent of this type is 2,4-dihydroxybenzophenone, known as "Uvinul" 400.

The following are typical ultraviolet absorbing agents which are preferred in this invention: a polymeric reaction product of orthohydroxybenzophenone, formaldehyde and phenol; dibenzoate of diphenylol propane; tertiary butyl benzoate of diphenylol propane; nonylphenyl benzoate; octylphenyl benzoate; dinonylphenyl terephthalate; resorcinol dibenzoate; 2,4-dihydroxyacetophenone; 2,4-dimethoxybenzoic acid; 3-methyl-5-isoprophenyl-6-hydroxy coumarone.

Substituted benzotriazoles, such as 2-(2'-hydroxy-5'-methyl phenyl)benzotriazole, are also useful ultraviolet filtering agents. Substituted acrylonitriles of the general formula

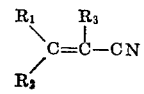

wherein $R_1$, $R_2$, and $R_3$ are aryl or alkyl disclosed in U.S. Patent 3,118,887, can also be used as ultraviolet light absorbing agents.

Agents can be used which act as both an extender pigment and also as an ultraviolet absorbing agent. Obviously, these agents are required to have the aforementioned properties of the extender pigment and also the properties of the ultraviolet light absorbing agent. Typical compounds which can be used are nickel hydrate, iron pyrophosphate and magnesium hypophosphate.

Any of the conventional clear vehicles which provide a durable coating for a wood substrate are useful in this invention, such as alkyd resins, epoxy resins, vinyl cyclic acetal resins, esters of acrylic acid and methacrylic acid and mixtures thereof, polyurethane resins, hydrofluorocarbon resins and a variety of other polyester resins. The preferred conventional vehicles are drying oil modified alkyl resins, esterified epoxy resins and vinyl cyclic acetal resins esterified with methacrylic and acrylic acid esters.

Alkyd resins which are polymeric esters prepared by the condensation of a polyhydric alcohol and a polybasic acid are useful film forming vehicles; the preferred alkyd resin is the esterification product of phthalic acid and glycerol. Usually the alkyd resin has an unsaturated monocarboxylic acid or a glyceride oil thereof, such as tung oil, linseed oil, soya oil or dehydrated castor oil, chemically combined therein.

One particularly preferred alkyd vehicle is a linseed oil modified glycerol phthalate alkyd. Such alkyds have been used in exterior finishes, but the addition of an ultraviolet light absorbing agent and the extender pigment of this invention to such an alkyd provides a coating composition with weathering characteristics greatly superior to conventional exterior finishes.

Another preferred film forming material useful in this invention is an esterified epoxy resin which is an oleoresinous esterification product of (1) rosin acids, (2) a mixture of higher fatty acids containing a major portion of polyethenoid acids, and (3) an esterifiable epoxyhydroxy polyether resin which is a condensate of a chlorohydrin and a bis(4-hydroxyphenyl)alkane; the chlorohydrin is epichlorohydrin or glycerol dichlorohydrin.

The preferred epoxyhydroxy polyether resin used as the vehicle has the following structural formula

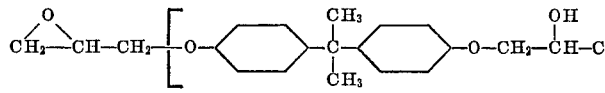
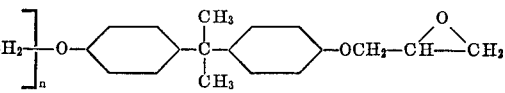

These epoxy resins may be prepared according to the procedure described in Greenlee U.S. Patent 2,456,408, issued Dec. 14, 1948, and U.S. Patent 2,503,726, issued Apr. 11, 1950. These epoxy resins are well known under the trade name "Epon" Resins and are fully described in technical publication SC: 54–46, Epon Resin Esters for Surface Coatings, Shell Chemical Corporation.

Another epoxy resin having an aliphatic hydrocarbon chain and the following structural formula can be used in this invention:

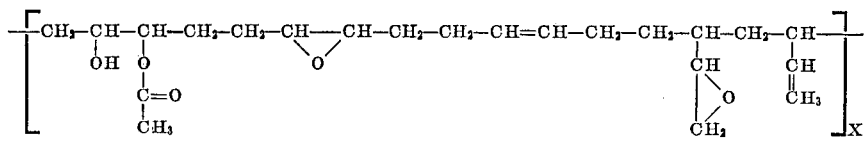

The preferred epoxy resins have an epoxide equivalent of at least 225 which is the number of grams of resin containing one gram equivalent of epoxy group

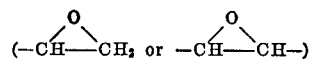

Also, the preferred epoxy resins have an equivalent weight of at least 105 which is the grams of resin required to esterify one gram mole of mono-basic acid. One particularly preferred epoxy resin, Epon 1004, has an epoxy equivalent weight of about 175.

Esterification of these epoxy resins can be accomplished by following the procedure described in Murphy U.S. Patent 2,843,554, issued July 15, 1948.

The following drying type fatty acids are useful for esterifying said epoxy resins: dehydrated castor acids, dimer fatty acids, linseed oil acids, ioticica fatty acids, soya acids and tung acids.

The above acids can be modified to give particularly desired properties with any of the following: acetic acid, tung acid or oil, coconut acid or oil, dehydrated castor acid or oil, cottonseed acid or oil, phenolic resin, lauric acid, dimer acids, para-tertiary-butyl benzoic acid, linseed acid or oil, styrene, oticica acid or oil, rosins, soya acid or oil and tall oil.

A particularly preferred epoxy ester vehicle used in this invention is the esterification product of a preferred epoxy resin, Epon 1004, having an epoxide equivalent of 870-1025 and an equivalent weight of 175 and a mixture containing a major portion of linseed oil and a corresponding minor portion of wood rosin.

Esthers of methacrylic acid, and particularly those formed by the esterification of methcrylic acid with $C_1$-$C_8$ alkanols, such as poly(n-butyl methacrylate), are useful vehicles. Also, copolymers having a major portion of $C_1$-$C_8$ methacrylic acid esters and a corresponding portion of $C_1$-$C_8$ acrylic acid esters are durable vehicles which can be used in this invention.

Vehicles formed from hydrofluorocarbon polymers can be used in this invention. Among the useful hydrofluorocarbon polymers are polyvinyl fluoride (e.g., as described in U.S. Patents 2,419,010 and 2,510,783), polyvinylidene fluoride (e.g., as described in U.S. Patent 2,435,537), vinyl fluoride copolymers (e.g., as described in U.S. Patent 2,953,818, Column 3), and vinylidene fluoride copolymers (e.g., as described in U.S. Patents 2,468,054 and 2,970,988). To illustrate, the copolymer can be a vinyl fluoride: vinylidene fluoride copolymer or a copolymer of either vinyl fluoride or vinylidene fluoride with at least one other halogen-substituted ethylenically unsaturated hydrocarbon comonomer. Especially useful copolymers in this class are terpolymers in which the third comonomer is an alkyl acrylate, alkyl methacrylate or bis—(2-cloroethyl phosphonate. However, the preferred copolymers have a vinyl fluoride or vinylidene fluoride content of at least 50 weight percent.

Another preferred polymeric composition which is used as a vehicle is an addition polymer containing extralinear carboxyl ester radicals which are terminated with the radical of a 1.3-cyclic acetal that has in its 2-position an alpha methylenically unsaturated substituent. The carboxyl carbon atom of each of the ester radicals is attached to a carbon atom in the polymer chain that has at least one hydrogen substituent. The 1.3-cyclic acetal

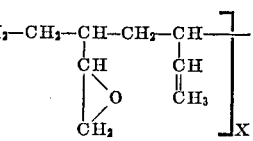

radical is connected to the polymer chain with carbon and carboxylate oxygen atoms.

In one particularly preferred vehicle, the 1,3-cyclic acetal is 2-vinyl-1,3-dioxolane and a major portion of the extralinear carboxyl esters are of methacrylic acid with a corresponding minor portion of the ester radicals being of acrylic acid. This polymer and other 1,3-cyclic acetal addition polymers useful in this invention can be prepared by the process of application Ser. No. 200,311, filed June 6, 1962, by McNally, now U.S. Patent No. 3,242,144, issued Mar. 22, 1966.

Typical useful 2-vinyl-1,3-cyclic acetal alcohols used with methacrylic and acrylic acid esters to form the above addition polymers are disclosed in U.S. Patents 3,010,924, 3,010,918 and 3,010,923.

The following examples are provided to illustrate this invention.

Example I

| First portion: | Pounds |
|---|---|
| A solution of 63% linseed oil glycerol phthalate alkyd (an 83% solids solution in a hydrocarbon solvent having an acid No. of 3-5, Gardner-Holdt viscosity of $Y-Z_1$) | 54.35 |
| A solution of soya lecithin (a 50% solids solution dissolved in mineral spirits of an etheral compound of choline and glycerophosphoric acid, combined as a glyceride with stearic and palmitic acid) | 6.22 |
| A solution of cresol (an 11% solids solution in mineral spirits of a mixture of guaiacol and 4-methyl-guaiacol) | 3.93 |
| Hydrocarbon solvent solution (having boiling range 175-223° C. and an aniline point (ASTM D-1012-51) 33-37° C. (1:1 dilution) for example Amsco Solv-F) | 229.69 |
| Second portion: | |
| Colloidal silica pigment having a particle size of 0.015-0.02 | 68.11 |
| Dimethyl dioctadycyl ammonium bentonite | 0.65 |
| Third portion: | |
| A solution of 63% linseed oil glycerol phthalate alkyd (same as in first portion) | 280.7 |
| A solution of lead naphthenate (63% solids solution in mineral spirits having 24% active lead) | 38.6 |
| A solution of cobalt naphthenate (54% solids solution in mineral spirits having 6% active cobalt) | 1.3 |
| A solution of calcium naphthenate (60% solids solution in mineral spirits having 4% active calcium) | 25.5 |
| A solution of phenyl mercury oleate (10% solids solution in mineral spirits) | 6.6 |
| A solution of 2,4-hydroxy benzophenone solution (30% solids solution in cyclohexanol) | 93.2 |
| Hydrocarbon solvent solution (same as in first portion) | 24.6 |
| Total pounds | 833.0 |

The materials of the first portion are mixed together for about 10 minutes. The materials of the second portion are slowly added to the mixture of the first portion and mixed for about 40 minutes. The mixture of the materials of the first and second portions are slowly drained into a sand-grinding unit which reduces the fineness of the dispersion to about zero. The sand-grinding process is of the type described in U.S. Patent 2,581,414. The materials of the third portion are slowly added to the mixture and mixed until thoroughly blended. The resulting coating material has the following characteristics: total solids content 50.16% by weight and 42.23% by volume, weight per gallon 8.33 pounds, viscosity at 25° C. of 24" in a #10 Parlin cup.

Example II

Following the procedure of Example I, the following substances are mixed together to form a coating composition:

| First portion: | Pounds |
|---|---|
| Epoxy ester (9 parts of an esterfiable epoxy hydroxy polyether resin—"Epon" 1004, 2 parts wood rosin, 9 parts linseed oil fatty acids; the mixture being esterified by following the process of Example I in U.S. Patent 2,843,554) | 50.12 |
| A solution of soya lecithin (50% solids solution in mineral spirits) | 4.63 |
| Xylol | 204.52 |
| Second portion: | |
| Colloidal silica having a particle size of 0.015-0.02 microns | 50.64 |
| Dimethyl dioctadecyl ammonium bentonite | 0.49 |
| Third portion: | |
| Epoxy ester (same as in first portion) | 258.77 |
| A solution of lead naphthenate (63% solids solution in mineral spirits having 24% active lead) | 28.73 |
| A solution of cobalt naphthenate (63% solids solution in mineral spirits having 6% active cobalt) | 0.99 |
| A solution of calcium naphthenate (63% solids solution in mineral spirits having 4% active calcium) | 18.96 |
| A solution of phenyl mercury oleate (10% solids solution in mineral spirits) | 4.87 |
| A solution of 2,4-dihydroxybenzophenone (30% solids solution in cyclohexanol) | 66.9 |
| Aromatic solvent (a mixture of aromatic hydrocarbon which boils in the range of 189-219° C.) | 97.38 |
| Total pounds | 787.0 |

The resulting coating composition has the following characteristics: total solids 38.66 percent by weight and 31.27 percent by volume, weight per gallon 7.87 pounds, viscosity at 25° C. of 24" in a #10 Parlin cup.

Example III

Following the procedure of Example I, the following substances are mixed together to form a coating composition:

| First portion: | Pounds |
|---|---|
| 1,3-cyclic acetal addition polymer (38 parts 4-hydroxy butyl-2-vinyl-1,3-dioxolane prepared by the procedure in Example I of U.S. Patent 3,010,923, 39.5 parts methyl methacrylate, 22.5 parts ethyl acrylate; the addition polymer being prepared according to the process of an application by McNally, Ser. No. 200,311, filed June 6, 1962) | 58.05 |
| A solution of soya lecithin (a 50% solids solution dissolved in mineral spirits) | 4.18 |
| Xylol | 197.8 |
| Second portion: | |
| Colloidal silica pigment having a particle size of 0.015-0.02 microns | 45.71 |
| Dimethyl dioctadecyl ammonium bentonite | 0.4 |
| Third portion: | |
| 1,3-cyclic acetal addition polymer (same as first portion) | 340.39 |
| A solution of cobalt butyl phthalate solution (33⅓% solids solution in xylol having 3.91% active cobalt) | 4.44 |
| A solution of phenyl mercury oleate (10% solids solution in mineral spirits) | 2.78 |
| A solution of 2,4-dihydroxybenzophenone solution (30% solids solution in cyclohexanol) | 77.31 |
| Xylol | 87.94 |
| Total pounds | 819.00 |

The resulting coating composition has the following characteristics: total solids 37.25% weight and 28.92% volume; weight per gallon 8.19 pounds; viscosity at 25° C. of 26 seconds in a #10 Parlin cup.

Example IV

Control coating compositions A, B and C corresponding to the coating compositions of Examples I, II and III are prepared by the procedures of these examples with the exception that the colloidal silica pigment and the ultra-violet light filtering agent, 2,4-dihydroxybenzophenone, are omitted. Coating compositions A, B and C are compared with those of Examples I, II and III by the following tests:

Test 1

The coating composition of Examples I, II and III and the corresponding control compositions A, B and C are each coated on redwood substrates.

Three coats are placed on each substrate, each being allowed to dry before the next is applied. The total coating thickness in each instance is about 3–4 mils. One set of the coated redwood substrates is exposed to outdoor weathering in Florida at a 45° angle facing south. Another set of the coated substrates is placed in a weatherometer and continuously exposed to alternating periods of simulated sunlight and water. Table I summarizes the results of the test:

TABLE I

| Coating Composition | Life of Film | |
|---|---|---|
| | Florida (months) | Weatherometer (hours) |
| Example I | 18–24 | 4,000 |
| Control A | 6–12 | 2,500 |
| Example II | 12 | 2,000 |
| Control B | 3–6 | 1,000 |
| Example III | +6 | 1,500 |
| Control C | 3–6 | 1,000 |

Test 2

The respective coating compositions of the examples and the control compositions are applied uniformly to a polyethylene film substrate to provide a dry coating thickness in the range of 2.5–3.5 mils and are permitted to air-dry for at least one week before testing. Specimens of the coated substrates are reserved for initial testing and other specimens are exposed in a weatherometer to accelerated weathering for 500, 1,000 and 1,500 hours respectively. The initial coatings and the weathered coatings are stripped from the substrate and examined for elongation and tensile strength at 32° F. Table II records these data.

TABLE II

| Property | Example I | Control A | Example II | Control B | Example III | Control C |
|---|---|---|---|---|---|---|
| (1) Percent elongation at 32° F.: | | | | | | |
| 0 hours | 6.0 | 5.6 | 3.6 | 5.3 | 20.0 | 20.0 |
| 500 hours | 3.8 | (¹) | 5.6 | (¹) | 10.0 | 5.0 |
| 1,000 hours | 1.6 | (¹) | 2.1 | (¹) | 7.0 | 0.0 |
| 1,500 hours | (¹) | (¹) | (¹) | (¹) | 6.5 | 0.0 |
| (2) Tensile strength at 32° F.: | | | | | | |
| 0 hours | 3,498 | 4,742 | 3,160 | 6,388 | 2,800 | 3,800 |
| 500 hours | 2,155 | (¹) | 3,125 | (¹) | 2,500 | +3,500 |
| 1,000 hours | 1,585 | (¹) | 3,257 | (¹) | 2,100 | 3,600 |
| 1,500 hours | (¹) | (¹) | +(¹) | (¹) | 2,100 | (¹) |

¹ Indicates coating is too brittle to test.

I claim:

1. A clear coating composition for protecting wood substrates from the deterioration of weathering consisting essentially of a vehicle of a linseed oil modified glycerol phthalate alkyd resin, about 1–15% by weight of said vehicle of an ultraviolet light absorbing agent having the formula

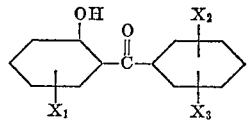

wherein $X_1$, $X_2$ and $X_3$ are each selected from the group consisting of hydrogen, hydroxyl, alkyl, alkoxy and halogen and an extender pigment of finely divided silica particles having a refractive index of 1.4–1.56, a particle size of 0.015–0.02 microns and being in a pigment volume concentration of about 2–25%.

2. The coating composition of claim 1 which contains about 5–10% by weight of said vehicle of an ultraviolet light absorbing agent of 2,4-dihydroxybenzophenone and said extender pigment of finely divided silica being in a pigment volume concentration of 5–15%.

3. A wood substrate coated on at least one surface with the dried coalesced composition of claim 1.

References Cited

UNITED STATES PATENTS

| | | | |
|---|---|---|---|
| 2,568,894 | 9/1951 | Mackey | 260—45.95 |
| 2,809,946 | 10/1957 | Blegen et al. | 260—22 |
| 2,970,128 | 1/1961 | Csendes | 260—45.95 |
| 2,976,259 | 3/1961 | Hardy et al. | 260—22 |
| 3,010,918 | 11/1961 | Ikeda | 260—23.5 |
| 3,043,709 | 7/1962 | Amborski | 260—45.95 |
| 3,251,704 | 5/1966 | Nellessen | 260—22 |

OTHER REFERENCES

Weth et al.: American Paint Journal, volume 42, No. 6.
Paint Industry Technical Yearbook and Materials Manual, 1959, volume 4.

DONALD E. CZAJA, *Primary Examiner.*

R. W. GRIFFIN, *Assistant Examiner.*